(12) United States Patent
Wei Siao

(10) Patent No.: US 7,191,565 B2
(45) Date of Patent: Mar. 20, 2007

(54) CONNECTING STRUCTURE OF AN ASSEMBLED TYPE SCREEN

(75) Inventor: Jhen-Siang Wei Siao, Taipei (TW)

(73) Assignee: Chingdar Enterprise Co., Ltd., Taipei (TW)

( * ) Notice: Subject to any disclaimer, the term of this patent is extended or adjusted under 35 U.S.C. 154(b) by 259 days.

(21) Appl. No.: 10/914,215

(22) Filed: Aug. 10, 2004

(65) Prior Publication Data

US 2006/0032994 A1 Feb. 16, 2006

(51) Int. Cl.
*A47G 5/00* (2006.01)

(52) U.S. Cl. ........................................ 52/36.4; 211/196

(58) Field of Classification Search ................ 248/200; 211/196, 198, 199, 200; 52/36.4, 36.5, 36.6
See application file for complete search history.

(56) References Cited

U.S. PATENT DOCUMENTS 3,351,313 A * 11/1967 Guillon ...................... 248/246
4,021,973 A * 5/1977 Hegg et al. ................. 52/36.6
5,690,239 A * 11/1997 Ballard ........................ 211/189
6,256,935 B1 * 7/2001 Walker ........................... 52/27
6,619,008 B1 * 9/2003 Shivak et al. ............... 52/731.5
6,634,824 B2 * 10/2003 Liu ............................. 403/217
2002/0023391 A1 * 2/2002 Nymark ....................... 52/36.4

* cited by examiner

*Primary Examiner*—Anita King
*Assistant Examiner*—Steven Marsh
(74) *Attorney, Agent, or Firm*—Rosenberg, Klein & Lee

(57) ABSTRACT

An assembled type screen includes screen boards, locating elements secured to vertical edges of the screen boards, and several elongate connecting members connected to the vertical edge portions of the screen boards; the locating elements are outwardly folded at the edges to form detaining portions; the elongate connecting members have at least one pair of opposing lateral walls, which define a lengthwise extending holding room, and an opening between them; each elongate member has a pair of hooked portions on two sides of each of the opening; the vertical edges of the screen boards are passed into respective holding rooms of the elongate members with the detaining edges of the locating elements snapping onto the hooked portions of the elongate members to stop the screen boards from separating from the elongate connecting members.

11 Claims, 5 Drawing Sheets

CONNECTING STRUCTURE OF AN ASSEMBLED TYPE SCREEN

BACKGROUND OF THE INVENTION

1. Field of the Invention

The present invention relates to an assembled type screen equipped with brackets for supporting a desk board on, more particularly one, which is easy to assemble and convenient to use, and which is structured in such a way that the brackets can be adjusted to any position between top and bottom thereof.

2. Brief Description of the Prior Art

Referring to FIG. 6, a conventional assembled type screen includes two screen boards 30, a connecting plate 40, and an elongate connecting member 60. Each screen board 30 is made with a single part, and has holding trenches 301 along four narrow sides thereof, screw holes 303 on an upper one and a vertical one of the four narrow sides, and slots 302 on the other vertical one of the four narrow sides. The connecting plate 40 is rectangular and slightly narrower than the holding trenches 301, and has through holes 401 thereon. The elongate connecting member 60 is taller than the screen boards 30, and it is formed by means of folding, punching and cutting a plate, and has a substantially U-shaped horizontal section, spaced slots along two parallel lateral sides, and round holes on an intermediate portion that is between the two parallel lateral sides; after the connecting member 60 is folded to have the substantially U-shaped horizontal section, the two parallel lateral sides are further folded along the edges thereof so as to have touching portions 601, which are perpendicular to the rest; the two parallel lateral sides of the connecting member 60 are further formed with two gaps 603, and a trench 604 between the gaps 603, and they are made to become flat by means of pliers at those portions thereof that are between the gaps 603 and the trench 604 such that connecting hooked projections 605 are formed. Furthermore, a support leg assembly 70 is secured on a lower portion of the elongate connecting member 60, and a bracket (not shown) is connected to a selected one of the slots of the member 60 for supporting a desk board on.

To assemble the screen, the connecting member 60 is connected to one of the screen boards 30 with an upper portion being fitted in the corresponding vertical holding trench 301, and secured by means of screws, and it is connected to the other screen board 30 with the hooked projections 605 being hooked onto the corresponding slots 302, and the connecting plate 40 is fitted in the upper holding trenches 301 of the screen boards 30 and secured in position by means of screws 50 such that the two screen boards 30 are securely connected together.

The above screen is found to have the following disadvantages:

1. The screen boards 30 have to be formed with slots 302 on a vertical narrow side for connection with the connecting member 60. And, it takes relatively much labor to form the connecting hooked projections 605 on the connecting member 60. Therefore, it is difficult and takes much time to manufacture the screen.
2. The elongate connecting member 60 is taller than the screen boards 30 therefore it will cause increase to the material cost.
3. The elongate connecting member 60 has a relatively complicated shape, and it takes many steps to manufacture the same.
4. The slots spaced along the lateral sides of the elongate connecting member 60 will show after the screen is assembled, and in turns, the appearance of the screen will be spoiled.
5. Because the slots are spaced along the lateral sides of the elongate connecting member 60, a bracket, which is hooked onto the slots for supporting a desk board on, can only be located at either one of a limited number of different heights.

SUMMARY OF THE INVENTION

It is a main object of the present invention to provide an improvement on an assembled type screen to overcome the above disadvantages.

The assembled type screen includes screen boards, locating elements secured to vertical edges of the screen boards, and several elongate connecting members connected to the vertical edge portions of the screen boards. The locating elements are outwardly folded at the edges to form detaining portions. The elongate connecting members have at least one pair of opposing lateral walls, which define a lengthwise extending holding room, and a lengthwise extending opening between them. Each connecting member has a pair of hooked portions on two sides of each of the opening. The vertical edges of the screen boards are passed into respective holding rooms of the connecting members with the detaining edges of the locating elements snapping onto the hooked portions of the connecting members to stop the screen boards from separating from the connecting members.

Furthermore, the elongate connecting members have fitting trenches along outer side thereof for fitting ornamental bars thereon. And, brackets are secured on selected ones of the connecting members for supporting a desk board thereon. Each bracket has a flat supporting portion for positioning the desk board on, and an insertion portion, which is inserted in, and secured to a corresponding fitting trench; thus, the brackets can be adjusted to any height along the fitting trenches.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
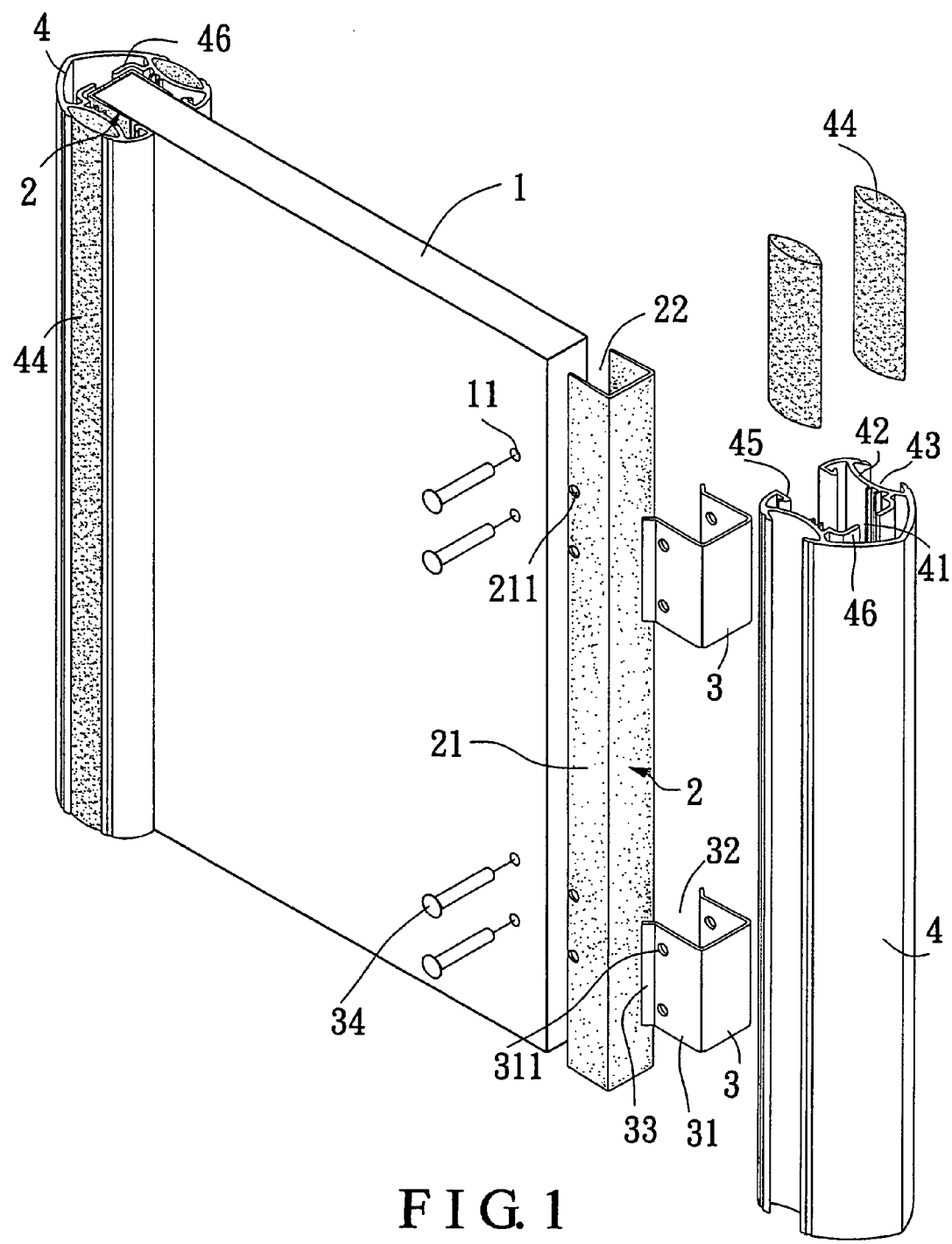
FIG. 1 is an exploded perspective view of the first embodiment of an assembled type screen in the present invention.

Referring to FIG. 1, a first embodiment of an assembled type screen in the present invention includes screen boards 1, elongate pressing members 2, locating elements 3, and elongate connecting members 4.

Each of the elongate pressing members 2 is formed with a single part, and a substantially U-shaped horizontal section, having two substantially parallel opposing lateral walls 21, an intermediate wall, a holding space defined by the lateral walls 21 and the intermediate wall, and an opening 22. The lateral walls 21 taper off from those ends thereof that are connected to the intermediate wall towards those ends thereof that oppose the opening 22. The elongate pressing members 2 further have several pairs of opposing fitting holes 211 along the lateral walls 21.

Each of the locating elements 3 is formed with a single part, and a substantially U-shaped horizontal section, having two substantially parallel opposing lateral walls 31, an intermediate wall, an opening 32, and a holding space defined by the lateral walls 31 and the intermediate wall. Furthermore, each locating element 3 is outwardly folded along vertical edge portions of the lateral walls 31 such that detaining edges 33 are formed. And, several pairs of opposing fitting holes 311 are formed near to the vertical edge portions of the lateral walls 31.

Each of the elongate connecting members 4 is formed with a single part simply by means of pulling action, and has two apart opposing lateral walls 42, an opening 41, fitting trenches 43 along outward sides of the lateral walls 42, a stopping portion 46, and two hooked portions 45, each of which extends from a respective vertical edge portion of the lateral walls 41; the opposing lateral walls 42 of each elongate connecting member 4 are not parallel to each other. A holding room is provided between the lateral walls 42 and the stopping portion 46. Furthermore, the elongate connecting members 4 have ornamental bars 44 fitted on the fitting trenches 43 thereof.

Each screen board 1 has several through holes 11 near to two vertical edge portions thereof. Each elongate pressing member 2 is positioned onto a respective vertical edge portion of the screen boards 1 from the openings 22 thereof, and the locating elements 3 are positioned onto the elongate pressing members 2 from the openings 32 thereof, and fixing elements 34 are passed through the fitting holes 311, 211 as well as the through holes 11 to secure the elongate pressing members 2 and the connecting elements 3 to the vertical edge portions of the screen boards 1. Each elongate connecting member 4 is positioned onto a respective elongate pressing member 2 from the opening 41 thereof with the hooked portions 44 snapping onto respective ones of the detaining edges 33 of the locating elements 3; thus, the elongate connecting members 4 are held steady on the vertical edges of the screen boards 1.

Figure 2:
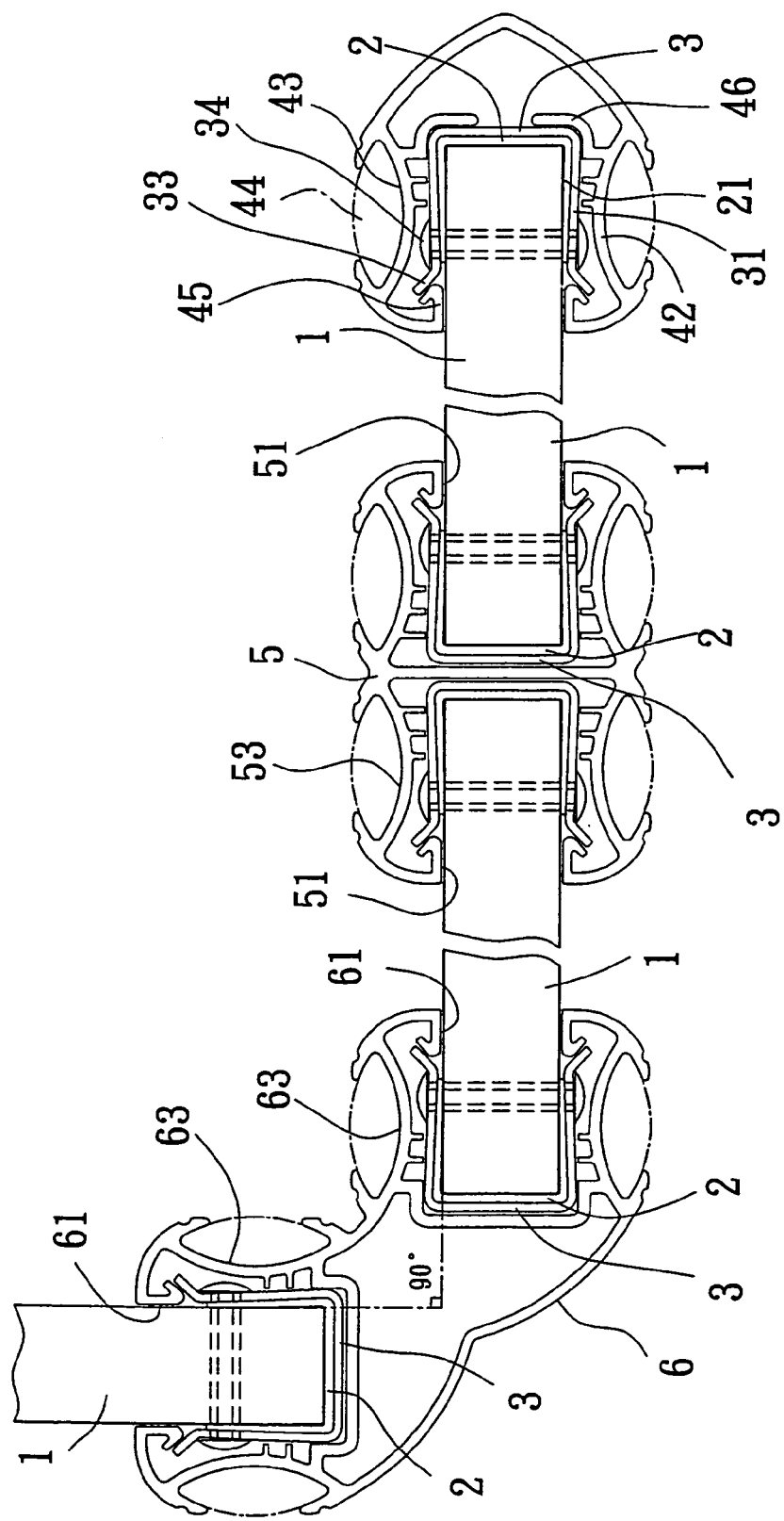
FIG. 2 is a top view of the second embodiment of an assembled type screen in the present invention.

Referring to FIG. 2, a second embodiment of an assembled type screen includes several screen boards 1, and several elongate connecting members 4, 5, and 6; each elongate connecting member 5 includes two connected portions, each of which substantially has the same shape as the elongate connecting members 4, and whose openings 51 face opposite directions; each of the elongate connecting members 6 includes two connected portions, each of which substantially has the same shape as the elongate connecting members 4, and whose openings 61 face such directions that they form a right angle between them. Therefore, in the second embodiment, every two ones of the screen boards 1 can be joined together to form an right angle between them with the help of an elongate connecting member 6 after they have been connected with respective elongate pressing members 2, and locating members 3. And, several screen boards 1 can be joined together to be on the same plane with the help of the elongate connecting members 5 after they have been connected with respective elongate pressing members 2, and locating members 3.

Figure 3:
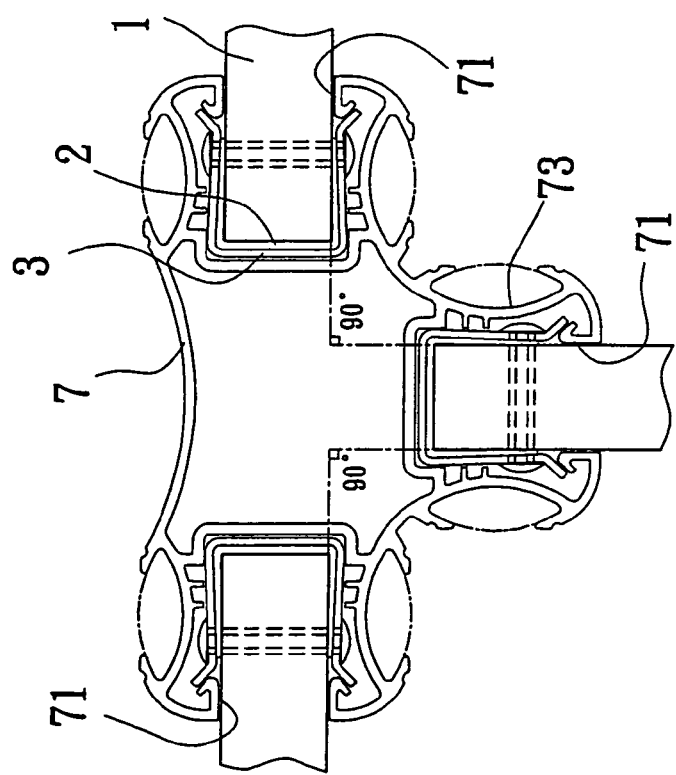
FIG. 3 is top view of the third embodiment of an assembled type screen in the present invention.

Referring to FIG. 3, a third embodiment of an assembled type screen includes several screen boards 1, and several elongate connecting members 7; each of the elongate connecting members 7 includes three connected portions, each of which substantially has the same shape as the elongate connecting members 4, and whose openings 71 face such directions that they form two right angles between them. Therefore, in the third embodiment, every three ones of the screen boards 1 can be joined together to form two right angles between them with the help of an elongate connecting member 7 after they have been connected with respective elongate pressing members 2, and locating members 3.

Figure 4:
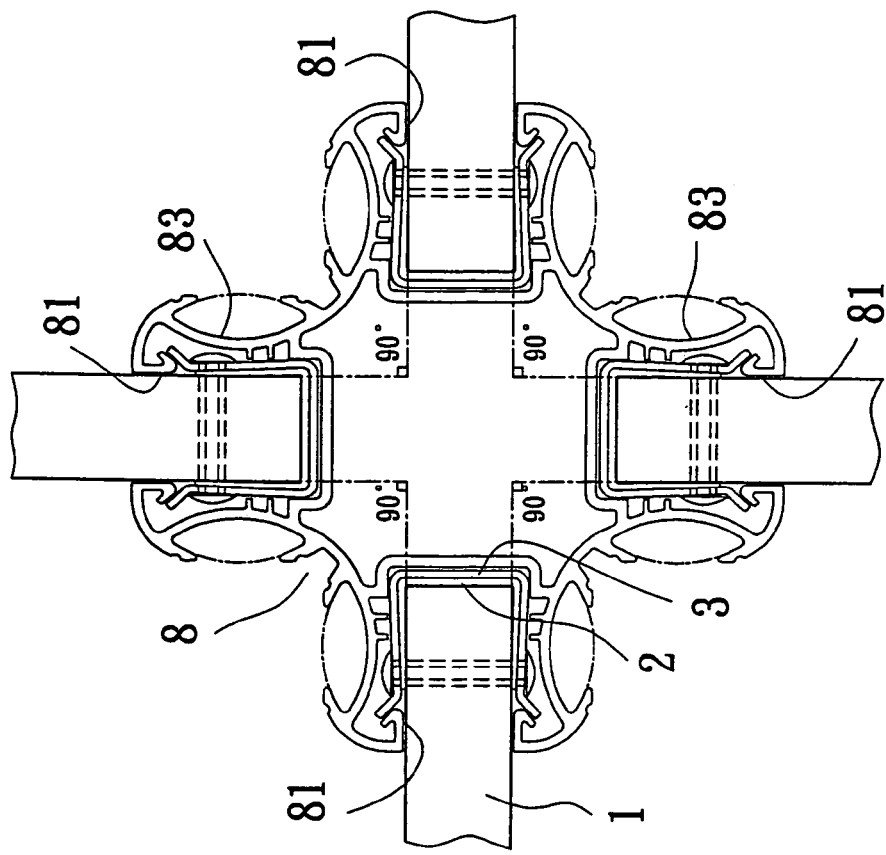
FIG. 4 is top view of the fourth embodiment of an assembled type screen in the present invention.

Referring to FIG. 4, a fourth embodiment of an assembled type screen includes several screen boards 1, and several elongate connecting members 8; each of the elongate connecting members 8 includes four connected portions, each of which substantially has the same shape as the elongate connecting members 4, and whose openings 81 face such directions that they form four right angles between them. Therefore, in the fourth embodiment, every four ones of the screen boards 1 can be joined together to form four right angles between them with the help of an elongate connecting member 8 after they have been connected with respective elongate pressing members 2, and locating members 3.

Figure 5:
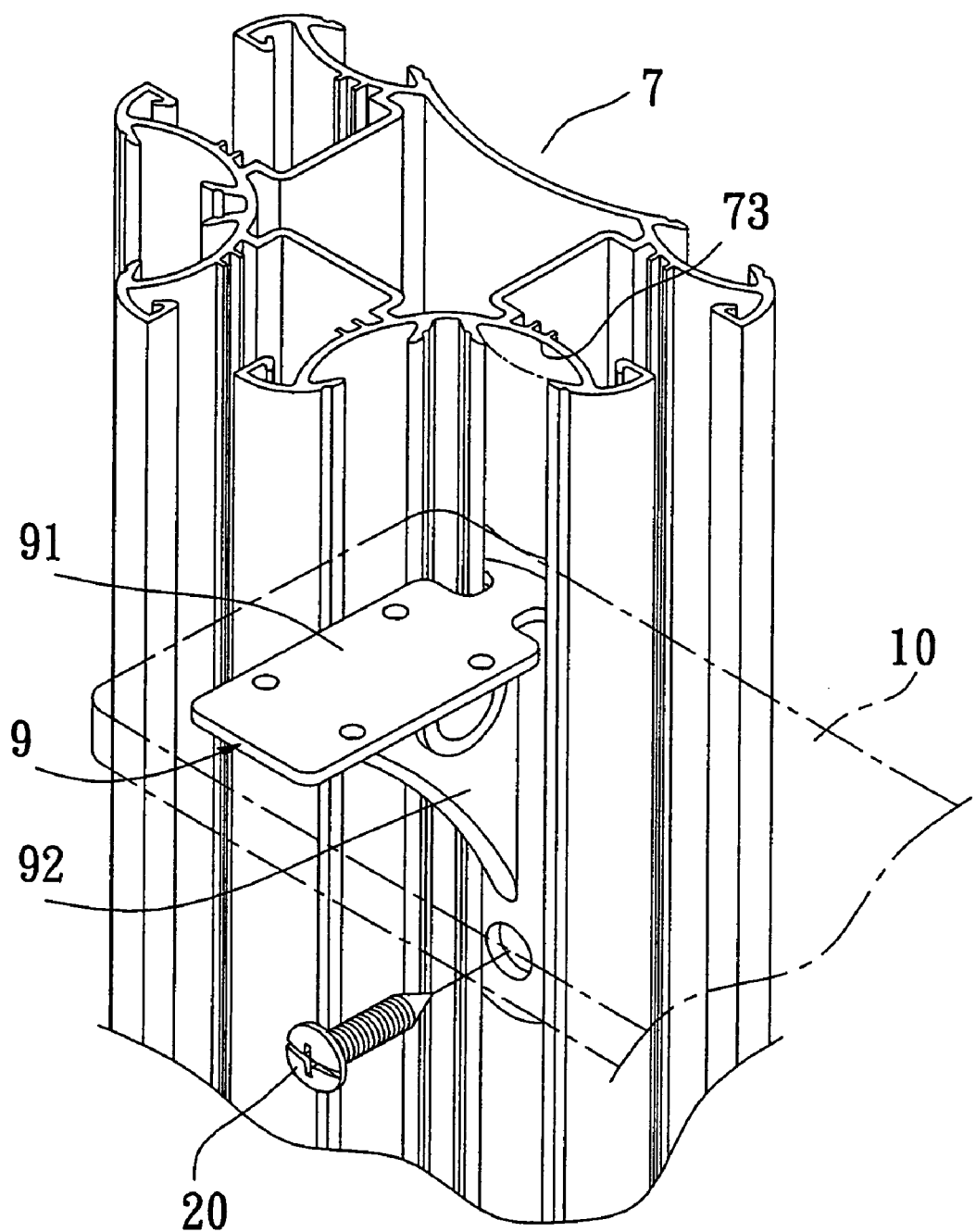
FIG. 5 is a partial perspective view of an assembled type screen of the present invention with a bracket secured thereto.
Figure 6:
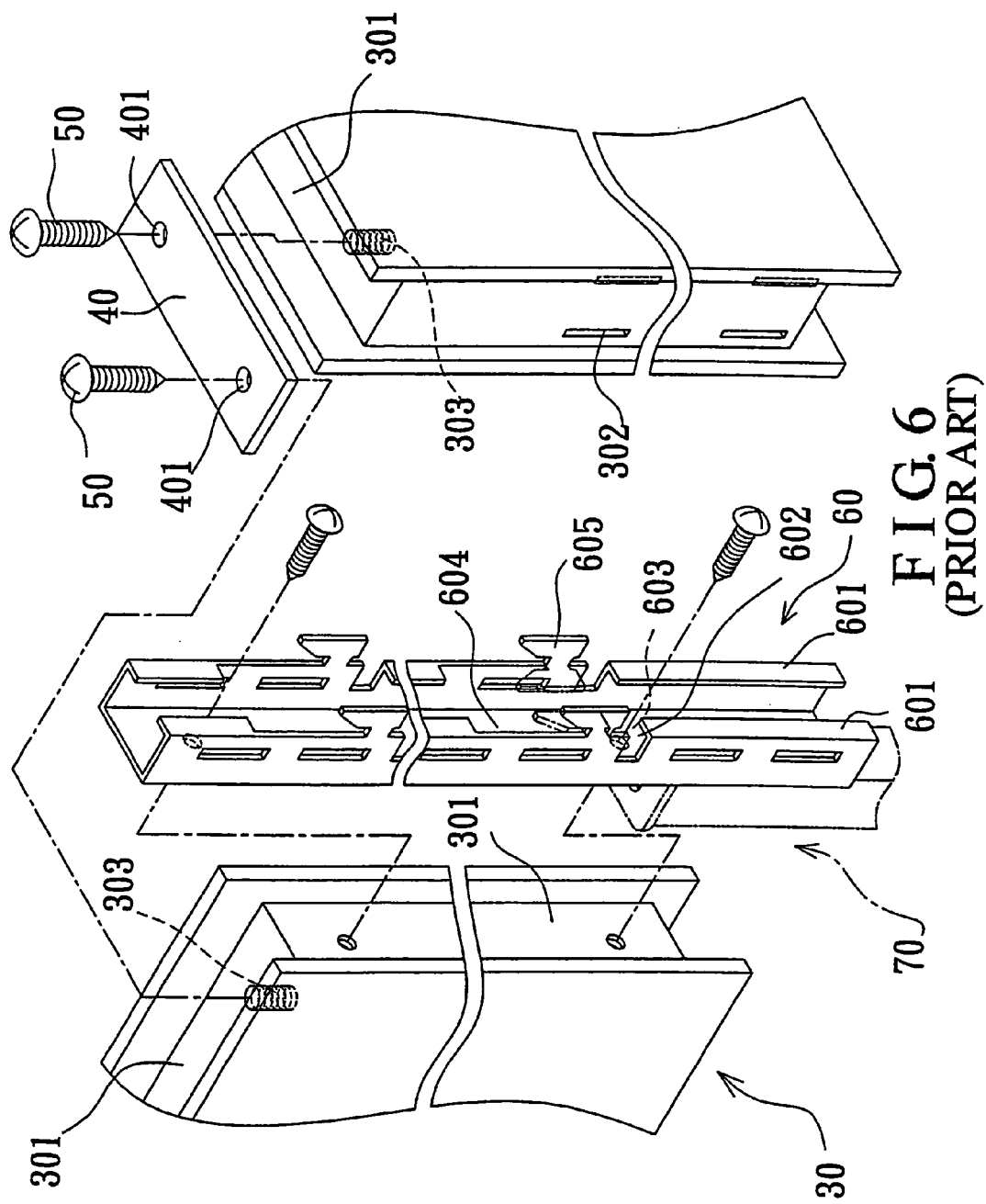
FIG. 6 is an exploded perspective view of the conventional assembled type screen.

Referring to FIG. 5, after a screen is assembled, brackets 9 are secured on selected ones of the elongate connecting members 4, 5, 6, 7, and 8 for supporting a desk board 10 thereon; each bracket 9 has a flat supporting portion 91 for positioning the desk board 10 on, an insertion portion 92 connected to a lower side of the flat supporting portion 91, and a hole on the insertion portion 92. The brackets 9 are inserted in corresponding fitting trenches 43, 53, 63, 73, 83 at the insertion portions 92 thereof, and securing elements 20 are passed through the holes of the insertion portions 92, and connected to the elongate connecting members 4, 5, 6, 7, 8 to secure the brackets 9 in position. Therefore, the brackets 9 can be adjusted in the height after the securing elements 20 have been undone.

From the above description, it can be easily understood that the assembled type screen of the present invention has advantages as followings:

1. The screen boards can be made off the shelf with the elongate pressing members and the locating elements fitted thereon such that the consumers only have to connect the elongate connecting members to the screen boards to assemble the screen after they buy the parts.
2. Because the locating elements 3 are made by means of simply folding flat plates, the manufacturing cost thereof is relatively low.
3. Because each of the elongate connecting members is formed with a single part simply by means of pulling action, the manufacturing cost thereof is relatively low.
4. The shape of the elongate connecting members is such that the look of the screen boards won't be spoiled after the screen is assembled.
5. Because the fitting trenches extend along the whole length of the elongate connecting members, the brackets can be located at any height between upper and lower ends of the corresponding fitting trenches therefore the desk board is more flexible than that of the conventional screen.

What is claimed is:

1. A connecting structure of an assembled type screen, comprising:
   a plurality of screen boards, each having two vertical edge portions;

a plurality of locating elements; the locating elements being formed with a substantially U-shaped horizontal section, having two opposing lateral walls, and an intermediate wall between the lateral walls; the locating elements being fitted onto, and secured to the vertical edge portions of the screen boards; the locating elements being outwardly folded along vertical edge portions of the lateral walls thereof for detaining edges to form; and a plurality of elongate connecting members connected to the vertical edge portions of the screen boards; each of the elongate connecting members having at least one pair of opposing lateral walls, which define a lengthwise extending holding room between them; each of the holding rooms having a lengthwise extending opening; each elongate connecting member having a pair of hooked portions on two sides of each of the lengthwise extending openings thereof; some of the elongate connecting members being of a first type, which each has single holding room;

the vertical edge portions of the screen boards being passed into respective ones of the holding rooms of the elongate connecting members with the detaining edges of the locating elements snapping onto the hooked portions of the elongate connecting members to stop the screen boards from separating from the elongate connecting members; and an elongate pressing member having a substantially U-shaped horizontal section being positioned between each of the vertical edge portions of the screen boards and corresponding locating elements.

2. The connecting structure of an assembled type screen as claimed in claim 1, wherein each of the elongate pressing members includes two opposing lateral walls, an intermediate wall between first edges of the lateral walls, and an opening between second edges of the lateral walls; each lateral wall tapering off from the first edge to the second edge thereof.

3. The connecting structure of an assembled type screen as claimed in claim 1, wherein the lateral walls of each of the locating elements are not perpendicular to the intermediate wall.

4. The connecting structure of an assembled type screen as claimed in claim 1, wherein some of the elongate connecting members are of a second type, which each has two holding rooms facing opposite directions.

5. The connecting structure of an assembled type screen as claimed in claim 1, wherein some of the elongate connecting members are of a third type, each having two holding rooms, which face such directions that a right angle is formed between them.

6. The connecting structure of an assembled type screen as claimed in claim 1, wherein some of the elongate connecting members are of a fourth type, each having three holding rooms, which face such directions that two right angles are formed between them.

7. The connecting structure of an assembled type screen as claimed in claim 1, wherein some of the elongate connecting members are of a fifth type, each having four holding rooms, which face such directions that four right angles are formed between them.

8. A connecting structure of an assembled type screen, comprising:

a plurality of screen boards, each having two vertical edge portions;

a plurality of locating elements; the locating elements being formed with a substantially U-shaped horizontal section, having two opposing lateral walls, and an intermediate wall between the lateral walls; the locating elements being fitted onto, and secured to the vertical edge portions of the screen boards; the locating elements being outwardly folded along vertical edge portions of the lateral walls thereof for detaining edges to form; and a plurality of elongate connecting members connected to the vertical edge portions of the screen boards; each of the elongate connecting members having at least one pair of opposing lateral walls, which define a lengthwise extending holding room between them; each of the holding rooms having a lengthwise extending opening; each elongate connecting member having a pair of hooked portions on two sides of each of the lengthwise extending openings thereof; some of the elongate connecting members being of a first type, which each has single holding room, the elongate connecting members being formed with fitting trenches along the lateral walls thereof for ornamental bars to be fitted in; and the vertical edge portions of the screen boards being passed into respective ones of the holding rooms of the elongate connecting members with the detaining edges of the locating elements snapping onto the hooked portions of the elongate connecting members to stop the screen boards from separating from the elongate connecting members.

9. The connecting structure of an assembled type screen as claimed in claim 8, wherein a plurality of brackets are secured on selected ones of the elongate connecting members for supporting a desk board thereon; each bracket having a flat supporting portion for positioning the desk board on, and an insertion portion, which is connected to a lower side of the flat supporting portion, and which is inserted in, and secured to a corresponding fitting trench.

10. A connecting structure of an assembled type screen, comprising:

a plurality of screen boards, each having two vertical edge portions;

a plurality of locating elements; the locating elements being formed with a substantially U-shaped horizontal section, having two opposing lateral walls, and an intermediate wall between the lateral walls; the locating elements being fitted onto, and secured to the vertical edge portions of the screen boards; the locating elements being outwardly folded along vertical edge portions of the lateral walls thereof for detaining edges to form; and a plurality of elongate connecting members connected to the vertical edge portions of the screen boards; each of the elongate connecting members having at least one pair of opposing lateral walls, which define a lengthwise extending holding room between them; each of the holding rooms having a lengthwise extending opening; each elongate connecting member having a pair of hooked portions on two sides of each of the lengthwise extending openings thereof; some of the elongate connecting members being of a first type, which each has single holding room, the elongate connecting members being formed with fitting trenches along the lateral walls thereof, and a plurality of brackets are secured on selected ones of the elongate connecting members for supporting a desk board thereon; each bracket having a flat supporting portion for positioning the desk board on, and an insertion portion, which is connected to a lower side of the flat supporting portion, and which is inserted in, and secured to a corresponding fitting trench; and the vertical edge portions of the screen boards being passed into respective ones of the holding rooms of the elongate connecting members with the detaining edges of the locating elements snapping onto the hooked portions of the elongate connecting members to stop the screen boards from separating from the elongate connecting members.

11. The connecting structure of an assembled type screen as claimed in claim 1, wherein the elongate connecting members have a stopping portion in each one of the holding rooms thereof.

* * * * *